US012580794B2

(12) United States Patent
Berliner et al.

(10) Patent No.: US 12,580,794 B2
(45) Date of Patent: Mar. 17, 2026

(54) MACHINE LEARNING BASED CONTROL CHANNEL RESOURCE SELECTION

(71) Applicant: QUALCOMM Incorporated, San Diego, CA (US)

(72) Inventors: Ran Berliner, Kfar-Aviv (IL); Shay Landis, Hod Hasharon (IL); Eitan Yerushalmi, Tel Aviv (IL); Yevgeny Zagalsky, Karmey Yosef (IL)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 18/490,052

(22) Filed: Oct. 19, 2023

(65) Prior Publication Data

US 2025/0132954 A1 Apr. 24, 2025

(51) Int. Cl.
*H04L 25/02* (2006.01)
(52) U.S. Cl.
CPC ...... *H04L 25/0224* (2013.01); *H04L 25/0254* (2013.01)

(58) Field of Classification Search
CPC ................................................... H04L 25/0224
See application file for complete search history.

(56) References Cited

U.S. PATENT DOCUMENTS

| | | | | |
|---|---|---|---|---|
| 2023/0068143 A1* | 3/2023 | Vobilishetti | ............ | G06N 20/00 |
| 2024/0357403 A1* | 10/2024 | Park | .................... | H04L 25/0254 |
| 2025/0005379 A1* | 1/2025 | Tang | ........................ | G06N 3/04 |

* cited by examiner

*Primary Examiner* — Zhiren Qin
(74) *Attorney, Agent, or Firm* — Patterson + Sheridan, L.L.P.

(57) ABSTRACT

Certain aspects of the present disclosure provide techniques for machine learning (ML) based control channel (CCH) resource selection. An example method, performed at a user equipment (UE), generally includes receiving, from a network entity, signaling indicating parameters for configuring a machine learning (ML) model, applying the parameters to configure the ML model, performing channel estimation based on at least one reference signal (RS) measurement, using the ML model to select control channel (CCH) resources to monitor, based on the channel estimation, and monitoring the selected CCH resources for a CCH transmission from the network entity.

30 Claims, 12 Drawing Sheets

500

P1 procedure

P2 procedure

P3 procedure

700

702

Data
Collection

Training Data

704

Model Training

Model
Deployment/
Update

Model
Performance
Feedback (FPS)

706

Model Inference

Inference Data

Output

708

Actor

Feedback

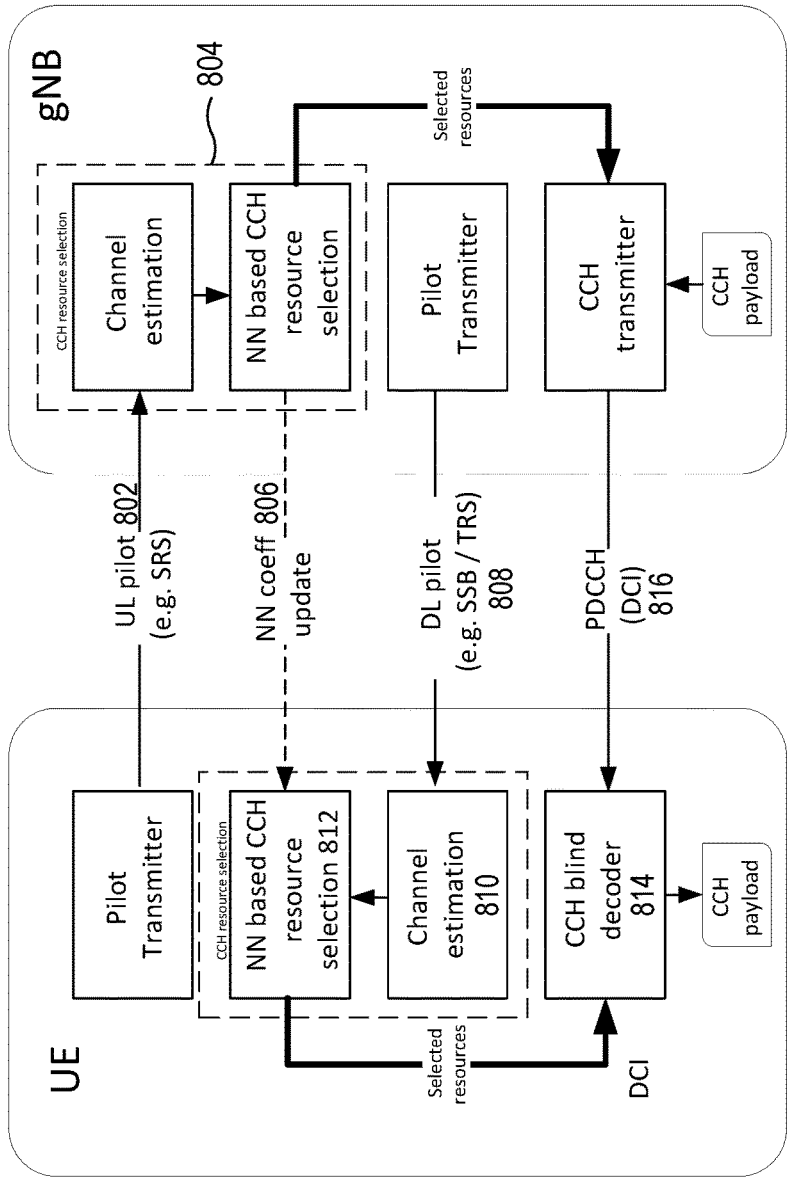
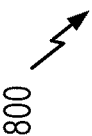
*FIG. 8*

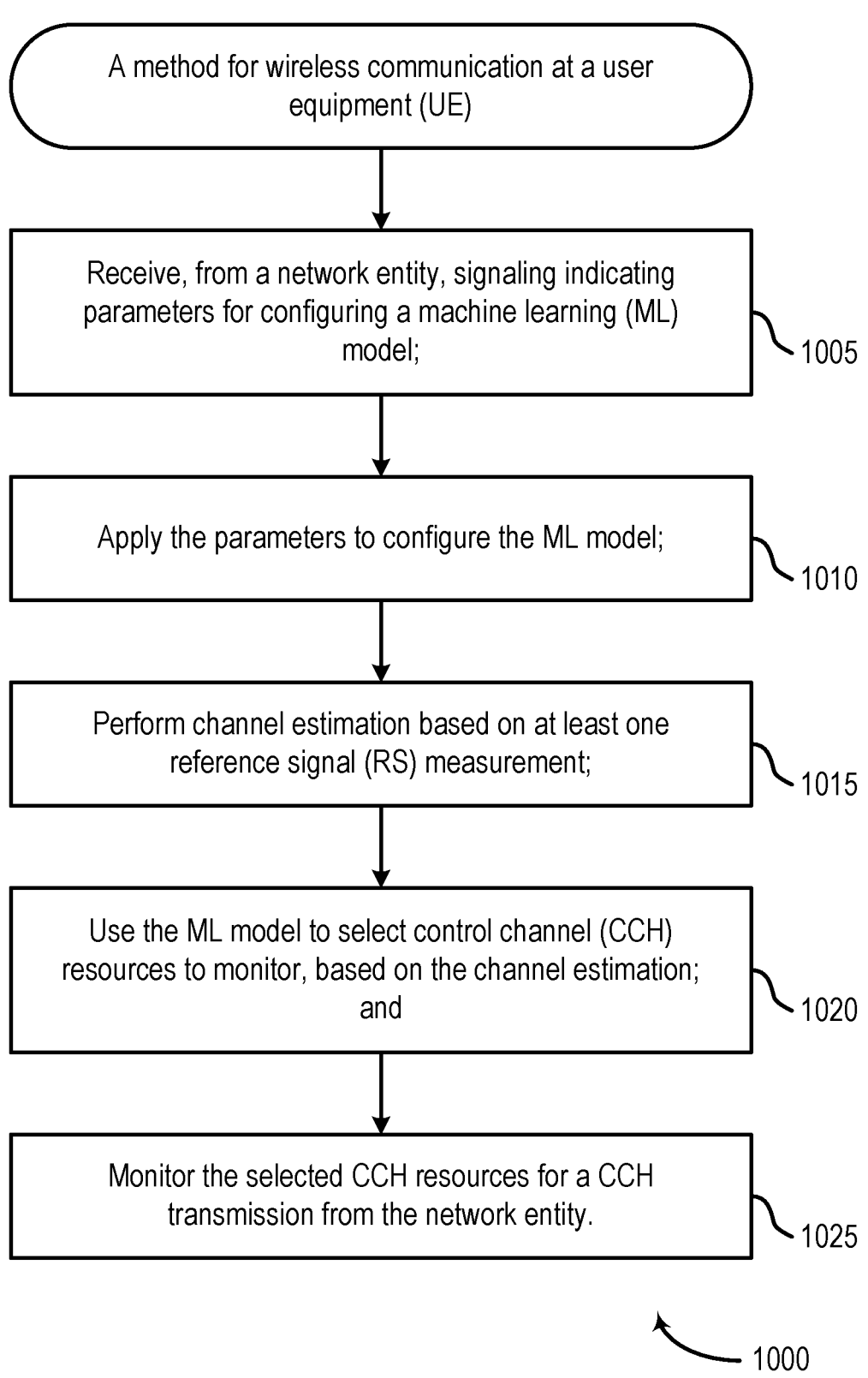

A method for wireless communication at a user equipment (UE)

Receive, from a network entity, signaling indicating parameters for configuring a machine learning (ML) model;          1005

Apply the parameters to configure the ML model;          1010

Perform channel estimation based on at least one reference signal (RS) measurement;          1015

Use the ML model to select control channel (CCH) resources to monitor, based on the channel estimation; and          1020

Monitor the selected CCH resources for a CCH transmission from the network entity.          1025

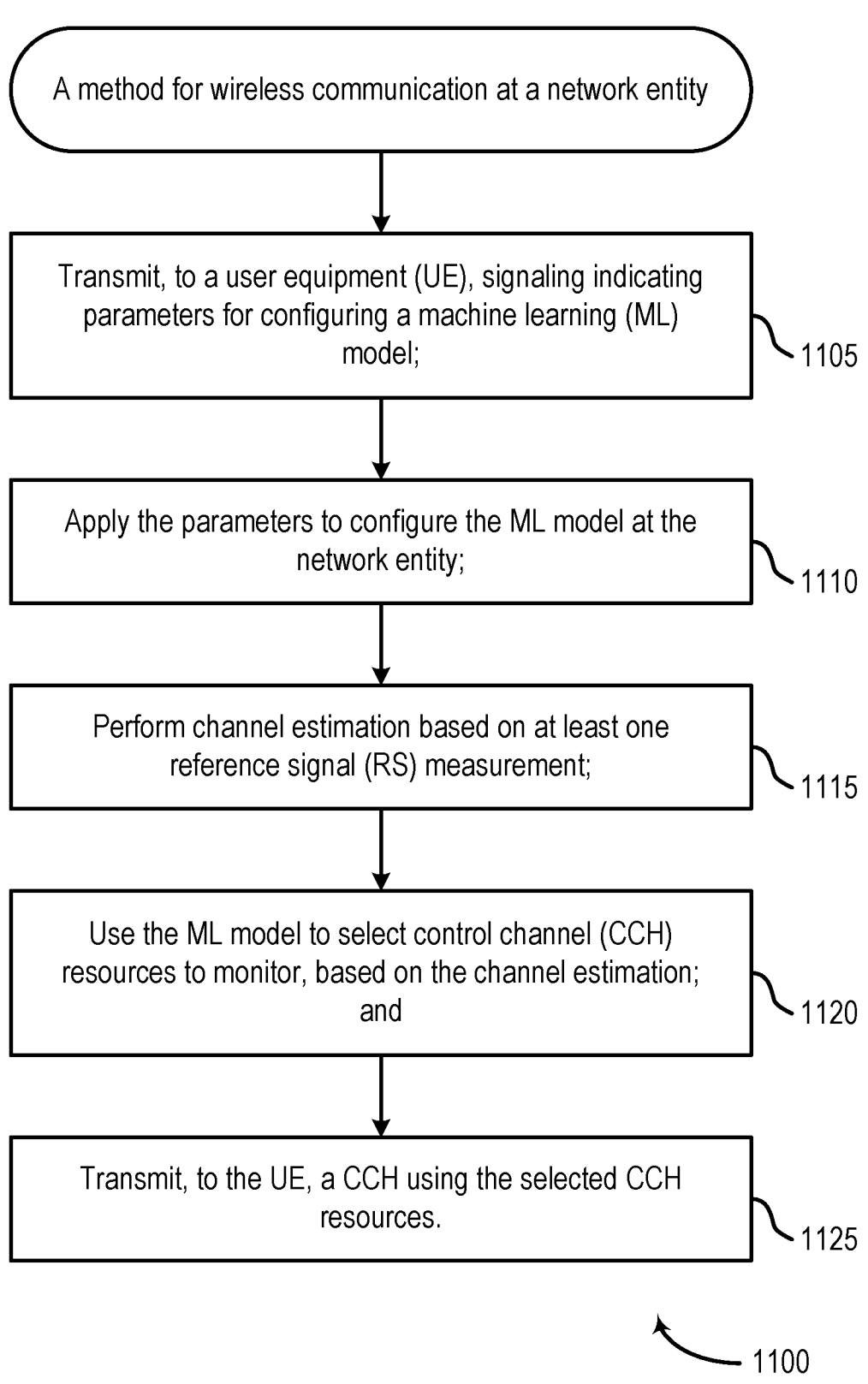

A method for wireless communication at a network entity

Transmit, to a user equipment (UE), signaling indicating parameters for configuring a machine learning (ML) model; — 1105

Apply the parameters to configure the ML model at the network entity; — 1110

Perform channel estimation based on at least one reference signal (RS) measurement; — 1115

Use the ML model to select control channel (CCH) resources to monitor, based on the channel estimation; and — 1120

Transmit, to the UE, a CCH using the selected CCH resources. — 1125

MACHINE LEARNING BASED CONTROL CHANNEL RESOURCE SELECTION

BACKGROUND

Field of the Disclosure

Aspects of the present disclosure relate to wireless communications, and more particularly, to techniques for machine learning (ML) based control channel (CCH) resource selection.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication at a user equipment (UE). The method includes receiving, from a network entity, signaling indicating parameters for configuring a machine learning (ML) model; applying the parameters to configure the ML model; performing channel estimation based on at least one reference signal (RS) measurement; using the ML model to select control channel (CCH) resources to monitor, based on the channel estimation; and monitoring the selected CCH resources for a CCH transmission from the network entity.

Another aspect provides a method for wireless communication at a network entity. The method includes transmitting, to a user equipment (UE), signaling indicating parameters for configuring a machine learning (ML) model; applying the parameters to configure the ML model at the network entity; performing channel estimation based on at least one reference signal (RS) measurement; using the ML model to select control channel (CCH) resources to monitor, based on the channel estimation; and transmitting, to the UE, a CCH using the selected CCH resources.

Other aspects provide: an apparatus operable, configured, or otherwise adapted to perform any one or more of the aforementioned methods and/or those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 8 depicts an example diagram illustrating machine learning (ML) based control channel (CCH) resource selection, in accordance with certain aspects of the present disclosure.

FIG. 10 depicts a method for wireless communications.

FIG. 11 depicts a method for wireless communications.

DETAILED DESCRIPTION

Figure 1:
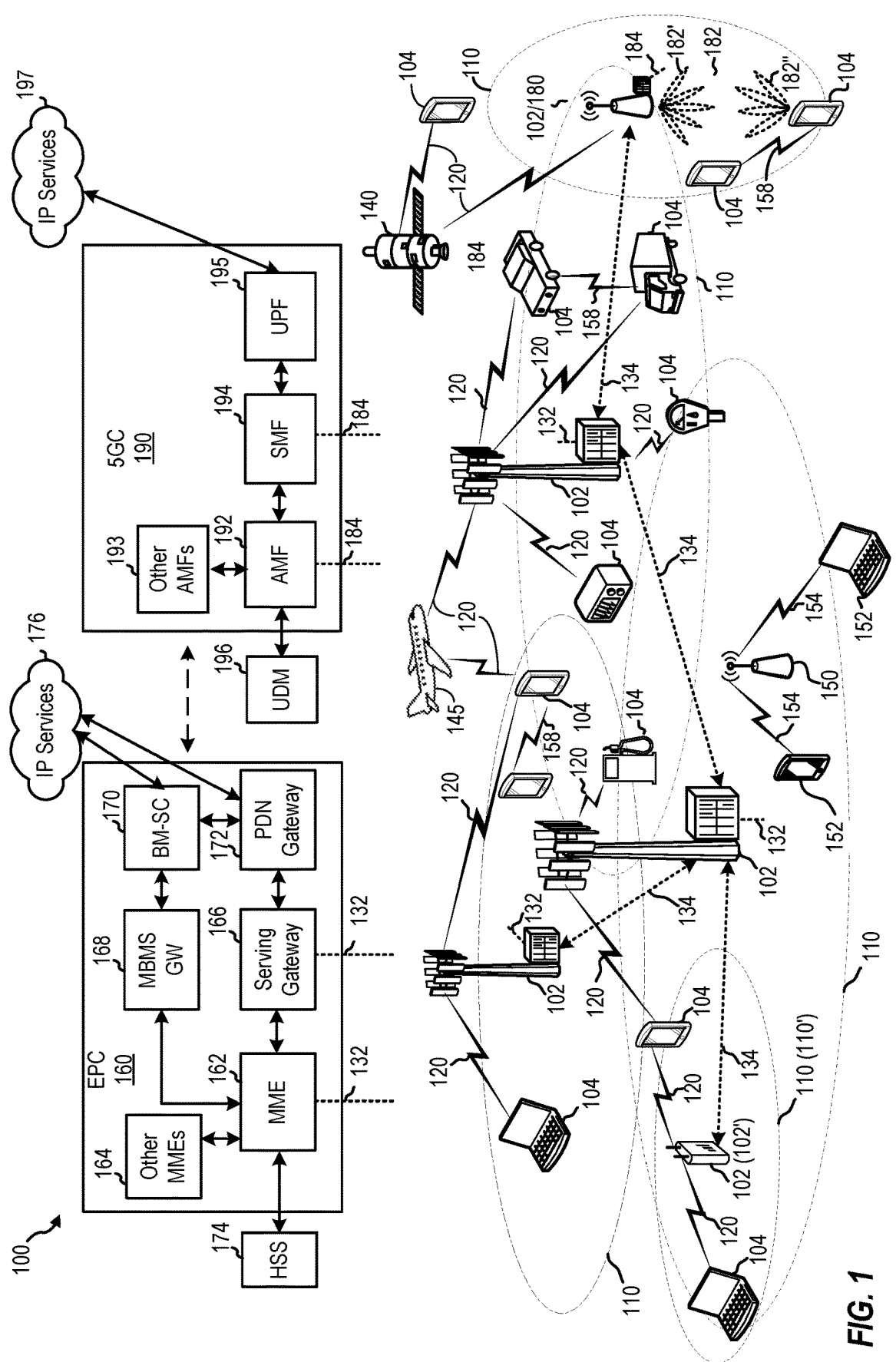
FIG. 1 depicts an example wireless communications network.

Aspects of the present disclosure provide apparatuses, methods, processing systems, and computer-readable mediums for machine learning (ML) based control channel (CCH) resource selection. The techniques disclosed herein may help reduce the peak number of decoding attempts per transmission time interval (e.g., a slot), which may reduce UE power consumption.

In many wireless communications technologies (e.g., 3G, 4G, 5G NR, CV2X, etc.) downlink control channel decoding is blind decoder based. Blind decoding in wireless communications generally refers to a process in which a receiver attempts to decode transmitted data without prior knowledge of certain channel or transmission parameters. For example, blind decoding may be used in scenarios where a user equipment (UE) is configured with a control resource set (CORESET) composed of a set of time and frequency domain resources, defined in units of resource element groups (REGs), but when the UE does not know which exact set of REGs is used to transmit a control channel, such as a physical downlink control channel (PDCCH).

Each REG may comprise a fixed number (e.g., twelve) tones/subcarriers in one symbol period (e.g., a symbol period of a slot), where one tone in one symbol period is referred to as a resource element (RE). A fixed number of REGs, such as six, may be included in a control channel element (CCE). Sets of CCEs may be used to transmit physical downlink control channels (PDCCHs), with different numbers of CCEs in the sets used to transmit PDCCHs using differing aggregation levels. Multiple sets of CCEs may be defined as search spaces (SSs) for UEs, and thus a network entity (e.g., a base station) may transmit a PDCCH to a UE by transmitting the PDCCH in a set of CCEs that is defined as a decoding candidate within a search space for the UE. To provide flexibility, the base station may be able to select a decoding candidate to transmit a PDCCH to a particular UE. Because the UE does not know which decoding candidate the base station selects, the UE may perform blind decoding, attempting to decode each of the multiple decoding candidates.

Blind decoding is, thus, costly in terms of power consumption and signaling overhead, and increases end-to-end (E2E) receive timelines (e.g., since blind decoding is performed on the entire decoding candidate list). The PDCCH decoder power consumption and dimensioning is dictated by the peak number of blind decode candidates per time slot (rather than the peak of actual number of transmitted CCH packets). For example, a 5G NR carrier with subcarrier spacing of 30 KHz may be required to perform up to 36 blind decode attempts per slot.

Certain aspects of the present disclosure provide techniques for artificial intelligence (AI)/machine learning (ML) based resource selection for certain channels (e.g., control channels (CCH)). By predicting the resources (e.g., location and aggregation level) used by a base station (e.g., a gNB) to transmit CCH, a UE may minimize the number of blind decoder attempts. According to certain aspects, the CCH resources prediction may be performed by the UE according to the channel knowledge, channel reciprocity assumptions, and a neural network (NN) used/trained by the base station for CCH resource selection, which may be communicated to the UE.

The techniques disclosed herein provide an efficient blind decoder framework, utilization of which may reduce the peak number of decoding attempts to the peak number of potential transmitted CCH per slot. Additionally, the techniques disclosed herein may reduce power consumption, reduce signaling overhead, and improve efficiency associated with CCH resource selection. The techniques presented herein may also help decrease decoder dimensioning requirements, while achieving faster E2E decoding due to reducing the number of blind decoding attempts.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
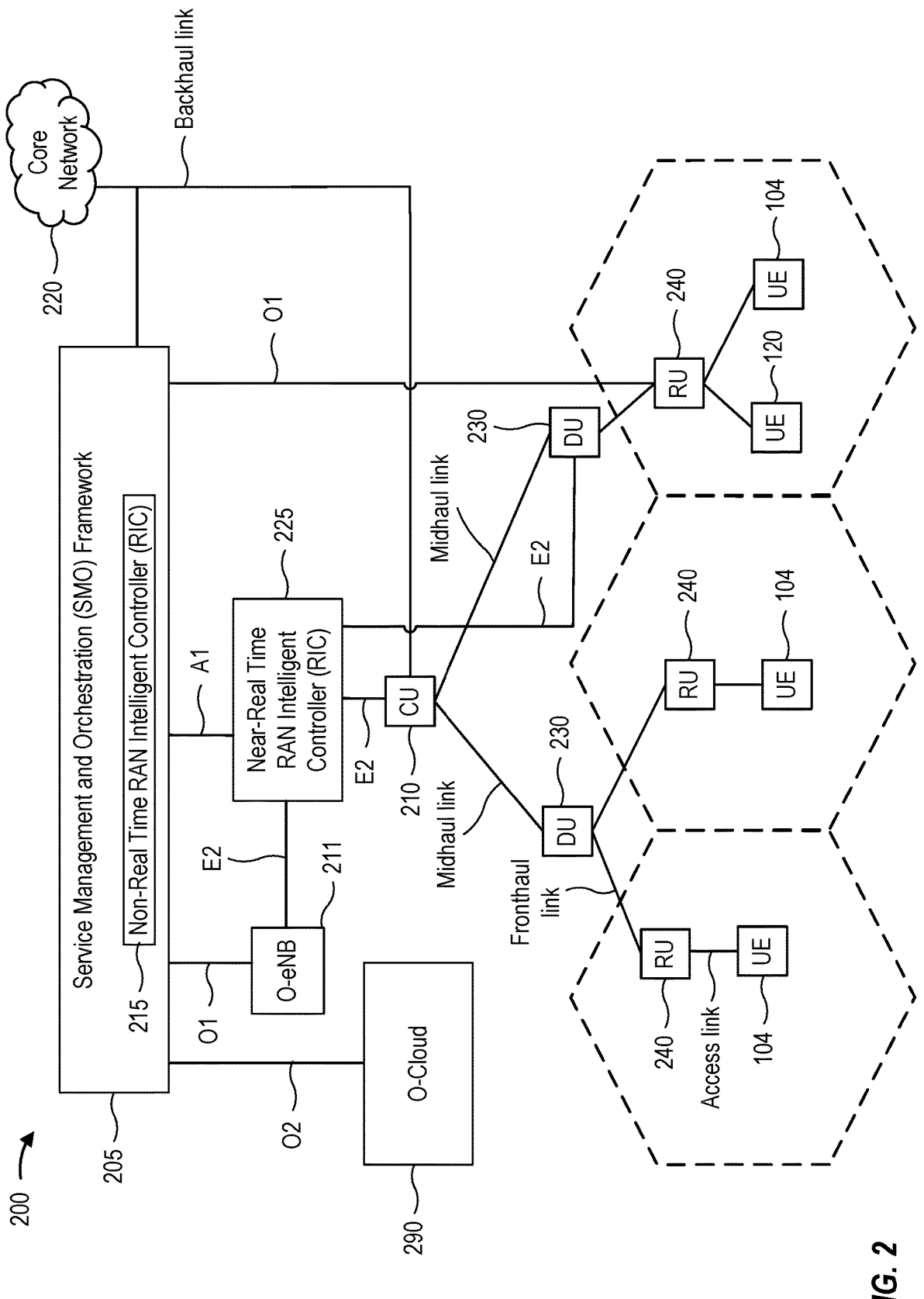
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to as (interchangeably) as "Sub-6 GHz". Similarly, 3GPP currently defines Frequency Range 2 (FR2) as including 24,250 MHz-71,000 MHZ, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52, 600 MHz and a second sub-range FR2-2 including 52,600 MHz-71,000 MHz. A base station configured to communicate using mm Wave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration.

The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
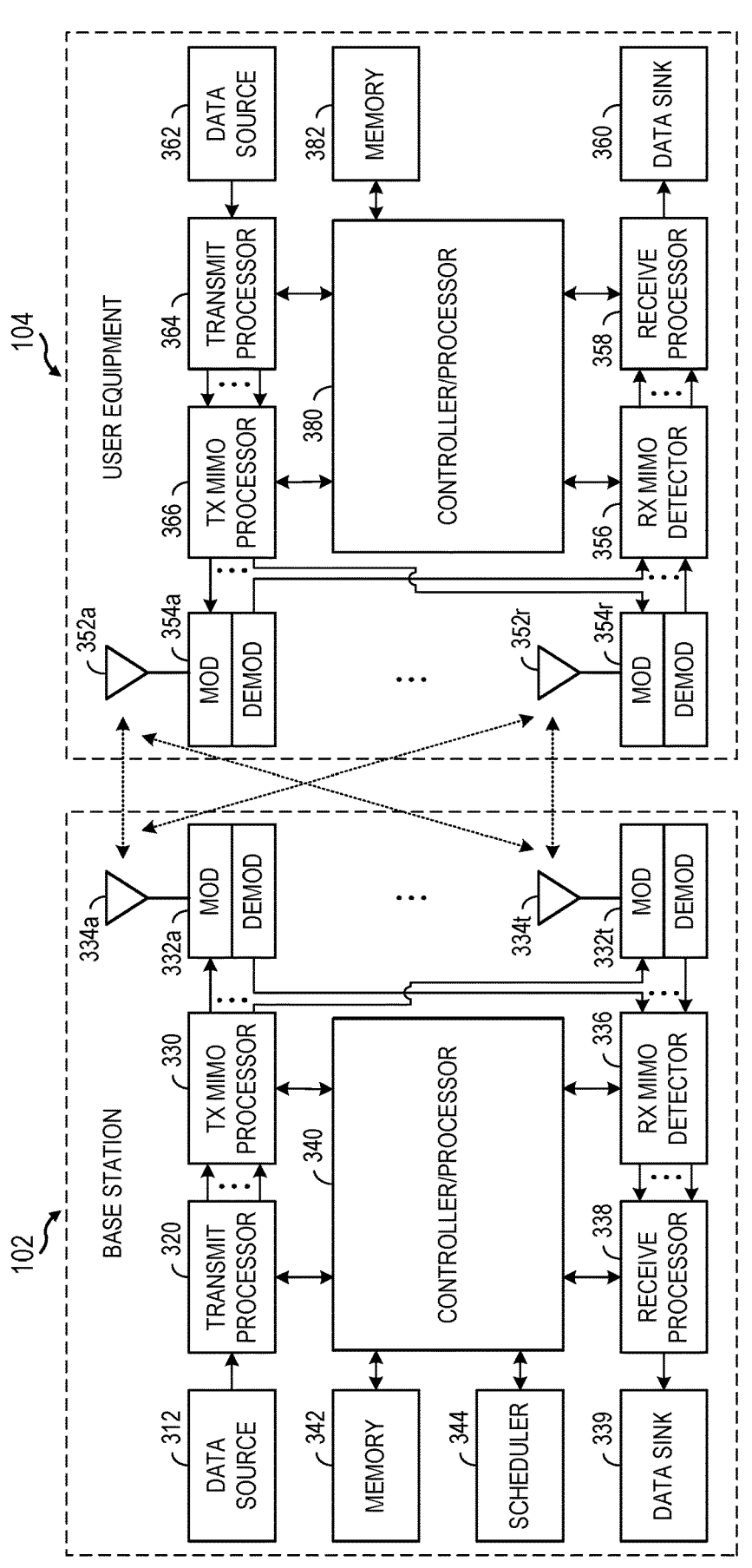
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a-332t*. Each modulator in transceivers 332*a-332t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a-332t* may be transmitted via the antennas 334*a-334t*, respectively.

In order to receive the downlink transmission, UE 104 includes antennas 352*a-352r* that may receive the downlink signals from the BS 102 and may provide received signals to the demodulators (DEMODs) in transceivers 354*a-354r*, respectively. Each demodulator in transceivers 354*a-354r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a-354r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a-354r* (e.g., for SC-FDM), and transmitted to BS 102.

At BS 102, the uplink signals from UE 104 may be received by antennas 334*a-t*, processed by the demodulators in transceivers 332*a-332t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, one or more processors may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
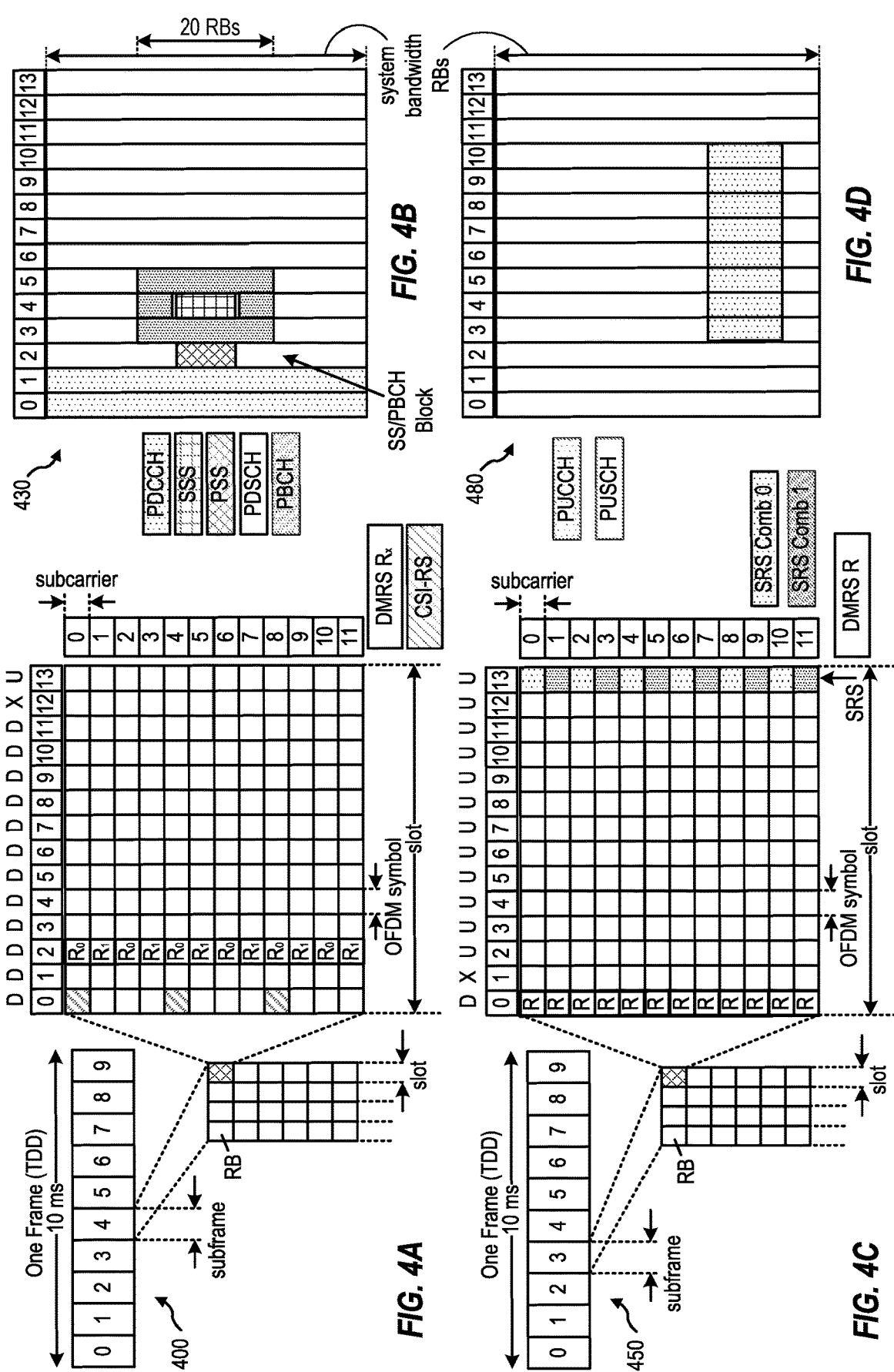
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 6. As such, the numerology μ=0 has a subcarrier spacing of 15 kHz and the numerology μ=6 has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Beam Refinement Procedures

In mmWave systems, beam forming may be important to overcome high path-losses. As described herein, beamforming may refer to establishing a link between a BS and UE, wherein both of the devices form a beam corresponding to each other. Both the BS and the UE find at least one adequate beam to form a communication link. BS-beam and UE-beam form what is known as a beam pair link (BPL). As an example, on the DL, a BS may use a transmit beam and a UE may use a receive beam corresponding to the transmit beam to receive the transmission. The combination of a transmit beam and corresponding receive beam may be a BPL.

As a part of beam management, beams which are used by BS and UE have to be refined from time to time because of changing channel conditions, for example, due to movement of the UE or other objects. Additionally, the performance of a BPL may be subject to fading due to Doppler spread. Because of changing channel conditions over time, the BPL should be periodically updated or refined. Accordingly, it may be beneficial if the BS and the UE monitor beams and new BPLs.

At least one BPL has to be established for network access. As described above, new BPLs may need to be discovered later for different purposes. The network may decide to use different BPLs for different channels, or for communicating with different BSs (TRPs) or as fallback BPLs in case an existing BPL fails.

The UE typically monitors the quality of a BPL and the network may refine a BPL from time to time.

Figure 5:
FIG. 5 illustrates example beam refinement procedures, in accordance with certain aspects of the present disclosure.

FIG. 5 illustrates example 500 for BPL discovery and refinement. In 5G-NR, the P1, P2, and P3 procedures are used for BPL discovery and refinement. The network uses a P1 procedure to enable the discovery of new BPLs. In the P1 procedure, as illustrated in FIG. 5, the BS transmits different symbols of a reference signal, each beam formed in a different spatial direction such that several (e.g., most or all) relevant places of the cell are reached. Stated otherwise, the BS transmits beams using different transmit beams over time in different directions.

For successful reception of at least a symbol of this "P1-signal", the UE has to find an appropriate receive beam. It searches using available receive beams and applying a different UE-beam during each occurrence of the periodic P1-signal.

Once the UE has succeeded in receiving a symbol of the P1-signal it has discovered a BPL. The UE may not want to wait until it has found the best UE receive beam, since this may delay further actions. The UE may measure the reference signal receive power (RSRP) and report the symbol index together with the RSRP to the BS. Such a report will typically contain the findings of one or more BPLs.

In an example, the UE may determine a received signal having a high RSRP. The UE may not know which beam the BS used to transmit; however, the UE may report to the BS the time at which it observed the signal having a high RSRP. The BS may receive this report and may determine which BS beam the BS used at the given time.

The BS may then offer P2 and P3 procedures to refine an individual BPL. The P2 procedure refines the BS-beam of a BPL. For example, the BS may transmit a few symbols of a reference signal with different BS-beams that are spatially close to the BS-beam of the BPL (the BS performs a sweep using neighboring beams around the selected beam). In P2, the UE keeps its beam constant. Thus, while the UE uses the same beam as in the BPL (as illustrated in P2 procedure in FIG. 5). The BS-beams used for P2 may be different from those for P1 in that they may be spaced closer together or they may be more focused. The UE may measure the RSRP for the various BS-beams and indicate the best one to the BS.

The P3 procedure refines the UE-beam of a BPL (see P3 procedure in FIG. 5). While the BS-beam stays constant, the UE scans using different receive beams (the UE performs a sweep using neighboring beams). The UE may measure the RSRP of each beam and identify the best UE-beam. Afterwards, the UE may use the best UE-beam for the BPL and report the RSRP to the BS.

Over time, the BS and UE establish several BPLs. When the BS transmits a certain channel or signal, it lets the UE know which BPL will be involved, such that the UE may tune in the direction of the correct UE receive beam before the signal starts. In this manner, every sample of that signal or channel may be received by the UE using the correct receive beam. In an example, the BS may indicate for a scheduled signal (e.g., SRS, CSI-RS) or channel (e.g., PDSCH, PDCCH, PUSCH, PUCCH) which BPL is involved. In NR, this information may be referred to as a quasi co-location (QCL) indication.

Two antenna ports are quasi co-located (QCL) if properties of the channel over which a symbol on one antenna port is conveyed may be inferred from the channel over which a symbol on the other antenna port is conveyed. QCL supports, at least, beam management functionality, frequency/timing offset estimation functionality, and radio resource management (RRM) functionality.

The BS may use a BPL which the UE has received in the past. The transmit beam for the signal to be transmitted and the previously-received signal both point in a same direction or are QCL. The QCL indication may be needed by the UE (in advance of signal to be received) such that the UE may use a correct receive beam for each signal or channel. Some QCL indications may be needed from time to time when the BPL for a signal or channel changes and some QCL indications are needed for each scheduled instance. The QCL indication may be transmitted in the downlink control information (DCI), which may be part of the PDCCH channel. Because DCI is needed to control the information, it may be desirable that the number of bits needed to indicate the QCL is not too big. The QCL may be transmitted in a medium access control-control element (MAC-CE) or radio resource control (RRC) message.

According to one example, whenever the UE reports a BS beam that it has received with sufficient RSRP, and the BS decides to use this BPL in the future, the BS assigns it a BPL tag. Accordingly, two BPLs having different BS beams may be associated with different BPL tags. BPLs that are based on the same BS beams may be associated with the same BPL tag. Thus, according to this example, the tag is a function of the BS beam of the BPL.

As noted above, wireless systems, such as millimeter wave (mmW) systems, bring gigabit speeds to cellular networks, due to availability of large amounts of bandwidth. However, the unique challenges of heavy path-loss faced by such wireless systems necessitate new techniques such as hybrid beamforming (analog and digital), which are not present in 3G and 4G systems. Hybrid beamforming may enhance link budget/signal to noise ratio (SNR) that may be exploited during the RACH.

In such systems, the node B (NB) and the user equipment (UE) may communicate over active beam-formed transmission beams. Active beams may be considered paired transmission (Tx) and reception (Rx) beams between the NB and UE that carry data and control channels such as PDSCH, PDCCH, PUSCH, and PUCCH. As noted above, a transmit beam used by a NB and corresponding receive beam used by a UE for downlink transmissions may be referred to as a beam pair link (BPL). Similarly, a transmit beam used by a UE and corresponding receive beam used by a NB for uplink transmissions may also be referred to as a BPL.

Since the direction of a reference signal is unknown to the UE, the UE may evaluate several beams to obtain the best Rx beam for a given NB Tx beam. However, if the UE has to "sweep" through all of its Rx beams to perform the measurements (e.g., to determine the best Rx beam for a given NB Tx beam), the UE may incur significant delay in measurement and battery life impact. Moreover, having to sweep through all Rx beams is highly resource inefficient. Thus, aspects of the present disclosure provide techniques to assist a UE when performing measurements of serving cells and neighbor cells when using Rx beamforming.

Example Beam Management

Figure 6:
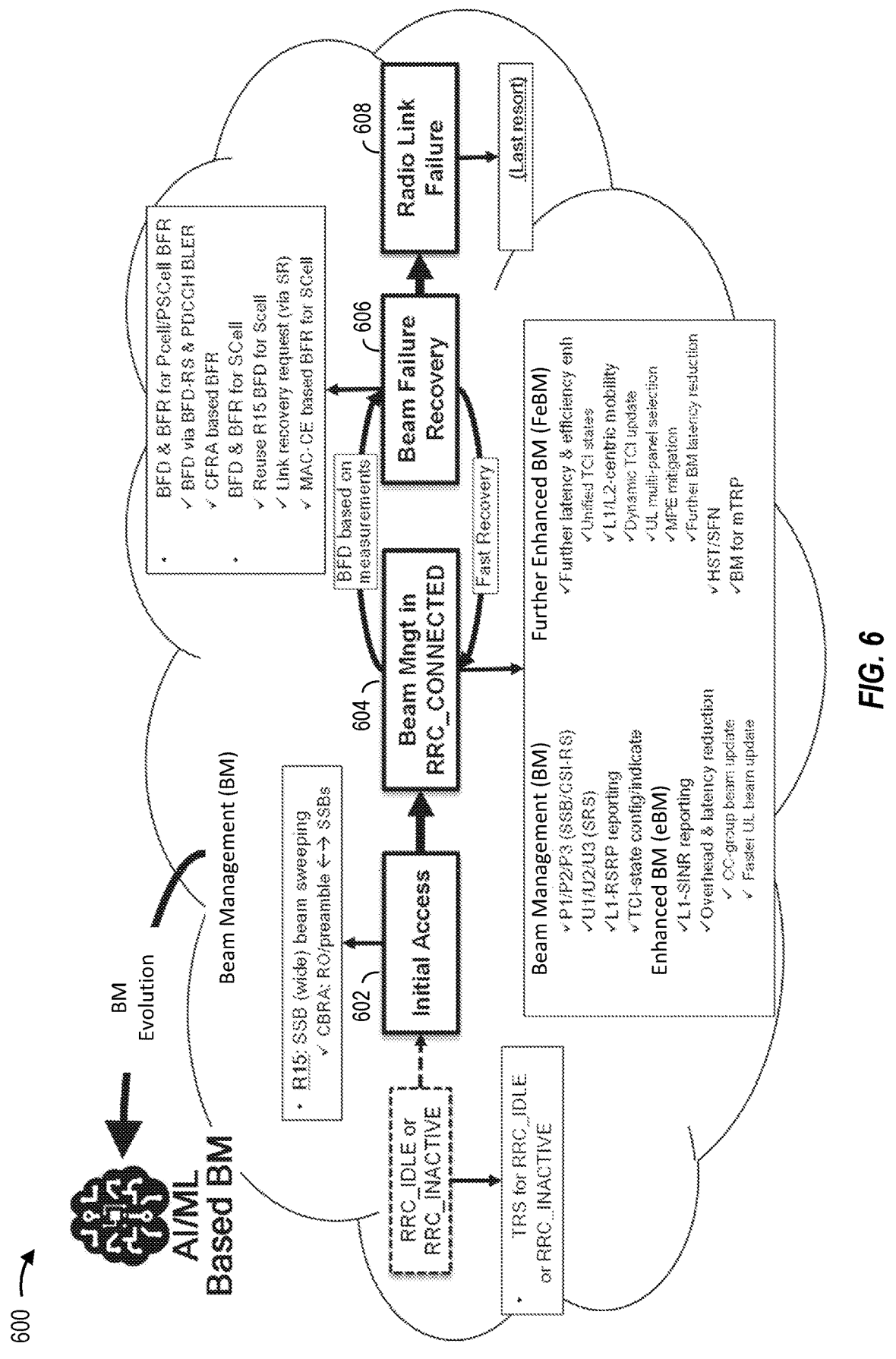
FIG. 6 is a diagram illustrating example operations where beam management may be performed.

In wireless communications, various procedures may be performed for beam management. FIG. 6 is a diagram illustrating example operations where beam management may be performed. In initial access 602, the network may sweep through several beams, for example, via synchronization signal blocks (SSBs), as further described herein with respect to FIG. 4B. The network may configure the UE with random access channel (RACH) resources associated with the beamformed SSBs to facilitate the initial access via the RACH resources. In certain aspects, an SSB may have a wider beam shape compared to other reference signals, such as a channel state information reference signal (CSI-RS). A UE may use SSB detection to identify a RACH occasion (RO) for sending a RACH preamble (e.g., as part of a contention-based Random Access (CBRA) procedure).

In connected mode 604, the network and UE may perform hierarchical beam refinement including beam selection (e.g., a process referred to as P1), beam refinement for the transmitter (e.g., a process referred to as P2), and beam refinement for the receiver (e.g., a process referred to as P3). In beam selection (P1), the network may sweep through beams, and the UE may report the beam with the best channel properties, for example. In beam refinement for the transmitter (P2), the network may sweep through narrower beams, and the UE may report the beam with the best channel properties among the narrow beams. In beam refinement for the receiver (P3), the network may transmit using the same beam repeatedly, and the UE may refine spatial reception parameters (e.g., a spatial filter) for receiving signals from the network via the beam. In certain aspects, the network and UE may perform complementary procedures (e.g., U1, U2, and U3) for uplink beam management.

In certain cases where a beam failure occurs (e.g., due to beam misalignment and/or blockage), the UE may perform a beam failure recovery (BFR) procedure 606, which may allow a UE to return to connected mode 604 without performing a radio link failure procedure 608. For example, the UE may be configured with candidate beams for beam failure recovery. In response to detecting a beam failure, the UE may request the network to perform beam failure recovery via one of the candidate beams (e.g., one of the candidate beams with a reference signal received power (RSRP) above a certain threshold). In certain cases where radio link failure (RLF) occurs, the UE may perform an RLF procedure 608 (e.g., a RACH procedure) to recover from the radio link failure.

Example Framework for AI/ML in a Radio Access Network

Figure 7:
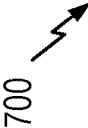
FIG. 7 illustrates a general functional framework applied for AI-enabled RAN intelligence.

FIG. 7 depicts an example of AI/ML functional framework 700 for RAN intelligence, in which aspects described herein may be implemented.

The AI/ML functional framework includes a data collection function 702, a model training function 704, a model inference function 706, and an actor function 708, which interoperate to provide a platform for collaboratively applying AI/ML to various procedures in RAN.

The data collection function 702 generally provides input data to the model training function 704 and the model inference function 706. AI/ML algorithm specific data preparation (e.g., data pre-processing and cleaning, formatting, and transformation) may not be carried out in the data collection function 702.

Examples of input data to the data collection function 702 (or other functions) may include measurements from UEs or different network entities, feedback from the actor function, and output from an AI/ML model. In some cases, analysis of data needed at the model training function 704 and the model inference function 706 may be performed at the data collection function 702. As illustrated, the data collection function 702 may deliver training data to the model training function 704 and inference data to the model inference function 706.

The model training function 704 may perform AI/ML model training, validation, and testing, which may generate model performance metrics as part of the model testing procedure. The model training function 704 may also be responsible for data preparation (e.g., data pre-processing and cleaning, formatting, and transformation) based on the training data delivered by the data collection function 702, if required.

The model training function 704 may provide model deployment/update data to the Model interface function 706. The model deployment/update data may be used to initially deploy a trained, validated, and tested AI/ML model to the model inference function 706 or to deliver an updated model to the model inference function 706.

As illustrated, the model inference function 706 may provide AI/ML model inference output (e.g., predictions or decisions) to the actor function 708 and may also provide model performance feedback to the model training function 704, at times. The model inference function 706 may also be responsible for data preparation (e.g., data pre-processing and cleaning, formatting, and transformation) based on inference data delivered by the data collection function 702, at times.

The inference output of the AI/ML model may be produced by the model inference function 706. Specific details of this output may be specific in terms of use cases. The model performance feedback may be used for monitoring the performance of the AI/ML model, at times. In some cases, the model performance feedback may be delivered to the model training function 704, for example, if certain information derived from the model inference function is suitable for improvement of the AI/ML model trained in the model training function 704.

The model inference function 706 may signal the outputs of the model to nodes that have requested them (e.g., via subscription), or nodes that take actions based on the output from the model inference function. An AI/ML model used in a model inference function 706 may need to be initially trained, validated and tested by a model training function before deployment. The model training function 704 and model inference function 706 may be able to request specific information to be used to train or execute the AI/ML algorithm and to avoid reception of unnecessary information. The nature of such information may depend on the use case and on the AI/ML algorithm.

The actor function 708 may receive the output from the model inference function 706, which may trigger or perform corresponding actions. The actor function 708 may trigger actions directed to other entities or to itself. The feedback generated by the actor function 708 may provide information used to derive training data, inference data or to monitor the performance of the AI/ML Model. As noted above, input data for a data collection function 702 may include this feedback from the actor function 708. The feedback from the actor function 708 or other network entities (e.g., via Data Collection function) may also be used at the model inference function 706.

The AI/ML functional framework 700 may be deployed in various RAN intelligence-based use cases. Such use cases may include CSI feedback enhancement, enhanced beam management (BM), positioning and location (Pos-Loc) accuracy enhancement, and various other use cases.

Aspects Related to AI/ML Based Control Channel (CCH) Resource Selection

Aspects of the present disclosure provide apparatuses, methods, processing systems, and computer-readable mediums for machine learning (ML) based control channel (CCH) resource selection. The techniques disclosed herein may help reduce the peak number of decoding attempts per transmission time interval (e.g., a slot), which may reduce UE power consumption. Certain examples described herein refer to a neural network (NN) as an example of a suitable ML based model for CCH resource selection, but the techniques described herein may utilize any type of ML-based model.

As noted above, in many wireless communications technologies, downlink control channel decoding is blind decoder based. Because the UE does not know which decoding candidate the base station selects, the UE may perform blind decoding, attempting to decode each of the multiple decoding candidates. As a result, blind decoding is costly in terms of power consumption and signaling overhead, and increases end-to-end (E2E) receive timelines (e.g., since blind decoding is performed on the entire decoding candidate list).

As noted above, the PDCCH decoder power consumption and dimensioning is dictated by the peak number of blind decode candidates per time slot (rather than the peak of actual number of transmitted CCH packets). For example, a 5G NR carrier with subcarrier spacing of 30 KHz may be required to perform up to 36 blind decode attempts per slot.

According to certain aspects of the present disclosure, a UE may support AI/ML (e.g., NN) based (simply referred to as ML-based) CCH candidate resource selection (e.g., location and aggregation level). In some aspects, the UE may perform CCH decoding attempts on selected CCH candidate resources only, rather than performing blind decoding on an exhaustive decoding candidate list.

These ML-based CCH resource selection techniques presented herein may be understood with reference to the diagram 800 of FIG. 8. In some aspects, the UE shown in FIG. 8 (and/or FIG. 9) may be an example of the UE 104 depicted and described with respect to FIGS. 1 and 3. In some aspects, the network entity shown in FIG. 8 (and/or FIG. 9) may be an example of the BS 102 (e.g., a gNB) depicted and described with respect to FIGS. 1 and 3 or a disaggregated base station depicted and described with respect to FIG. 2.

Input into an ML model for CCH resource selection may include channel estimation, performed at the UE and/or network based on reference signals.

For example, as illustrated at 802, a UE may transmit an uplink pilot signal (e.g., a sounding reference signal (SRS)) to a gNB. As illustrated at 804, the gNB may estimate the channel based on the uplink pilot signal (e.g., measurements of the pilot signal), and may perform neural network based CCH resource selection based on the channel estimation.

In such cases, the network may train the NN and/or update parameters/coefficients of the NN based on the channel estimation. The trained NN and/or the updated parameters/coefficients of the NN may be used to select CCH resources. As illustrated at 806, the trained NN and/or the updated parameters/coefficients of the NN may be transmitted to the UE.

As illustrated at 808, the gNB may also transmit a downlink pilot signal (e.g., a synchronization signal block (SSB) or tracking reference signal (TRS)). As illustrated at 810, the UE may estimate the channel based on the pilot signal (e.g., measurements of the pilot signal). As illustrated at 812, the UE may perform NN based CCH resource selection/prediction based on the channel estimation, the trained NN, and/or the updated parameters/coefficients of the NN (received from the UE at 806).

As illustrated at 814, the UE may use the selected CCH resources for blind decoding of a CCH transmission (e.g., a PDCCH/DCI 816 from the gNB). Using the selected CCH resources, the number of blind decoding attempts may be reduced, which may result in more efficient processing, faster PDCCH detection, and reduced power consumption.

In some aspects, a UE may indicate capability information to the gNB (e.g., in a UE capability report). For example, the UE may indicate its capability/capacity to utilize ML models (e.g., NNs) for CCH resource prediction, as well as other optimizations, capabilities, and/or restrictions.

In some aspects, as noted above, the NN (e.g., or other ML model) may be trained by the gNB and communicated to the UE. For example, the gNB may train the NN based on certain desired criteria, UE restrictions/capability, and/or gNB receiver details. The NN coefficients/parameters may be communicated to the UE by the gNB (e.g., initially and when updated).

In some aspects, the gNB may assume channel reciprocity and may use the trained/updated NN to select optimized CCH resource(s) according to (e.g., received) channel and noise estimations. The UE may apply the NN to the estimated channel and noise to select the CCH resources for blind decoding (e.g., determining the location and aggregation level and, thus, particular decoding candidates).

Figure 9:
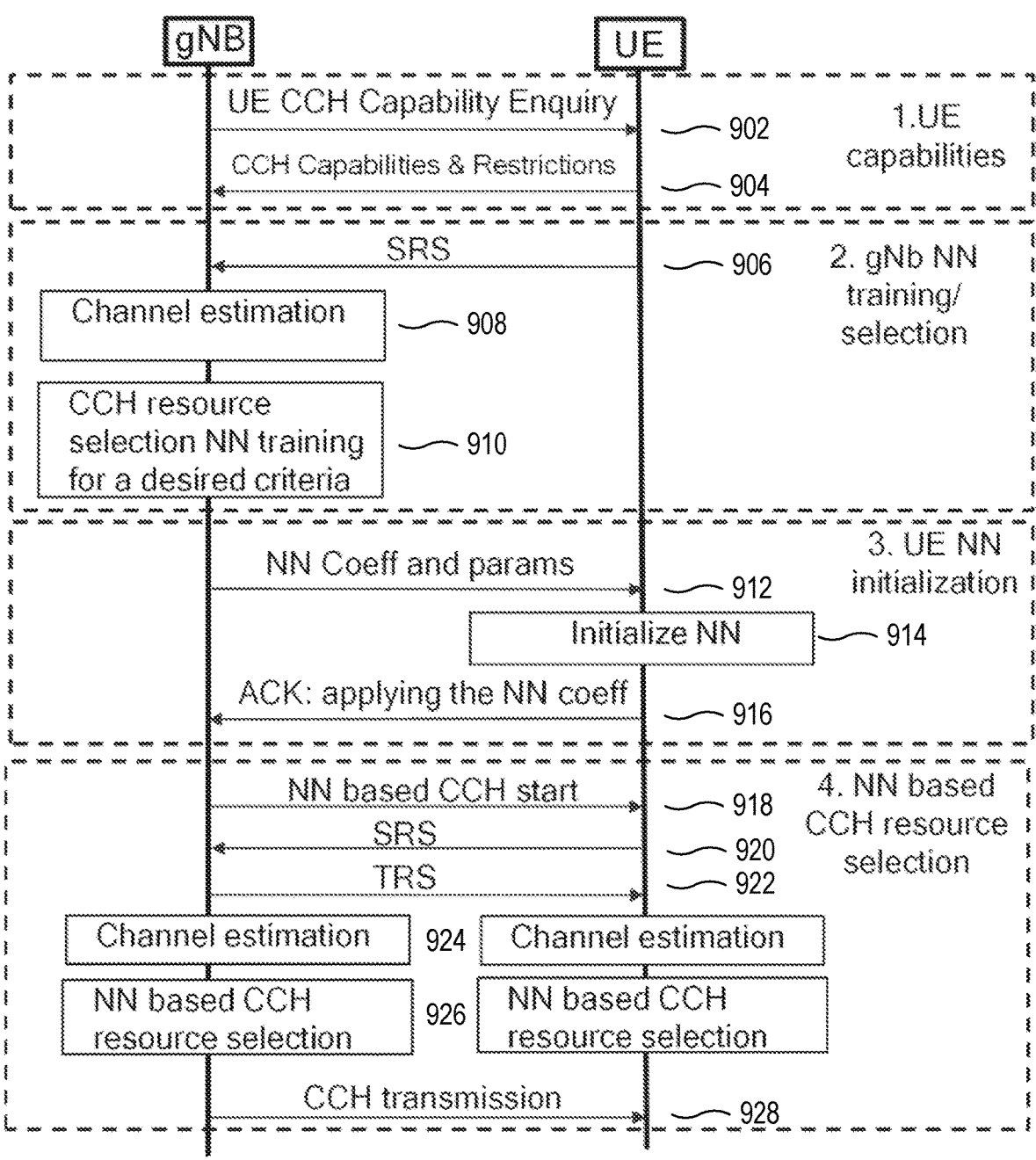
FIG. 9 depicts an example call flow diagram illustrating ML based CCH resource selection, in accordance with certain aspects of the present disclosure.

FIG. 9 depicts an example call flow diagram 900 illustrating ML based CCH resource selection, in accordance with certain aspects of the present disclosure.

In some aspects, as illustrated at 902, the gNB may transmit an inquiry for capability information from the UE. For example, the gNB may request that the UE report NN capability information (e.g., if the UE is capable of using an NN to select/predict CCH resource). As illustrated at 904, the UE may indicate its NN capacities as well as other capability information and/or optimization restrictions, in response to the request.

As illustrated at 906, the UE may transmit an uplink pilot signal (e.g., a sounding reference signal (SRS)) to the gNB. As illustrated at 908, the gNB may estimate the channel based on the pilot signal (e.g., measurements of the pilot signal). As illustrated at 910, the gNB may perform ML-based (e.g., NN based) CCH resource selection based on the channel estimation.

For example, the network may (e.g., based on desired criteria, UE restrictions, and/or gNB receiver details) train/select a NN and/or select/update parameters/coefficients of the NN based on the channel estimation. In some aspects, the gNB may choose NN from a given option list (e.g., defined in certain wireless communications standards) or use a proprietary NN. In some aspects, the NN may be further trained by the gNB using channel estimation and/or noise estimation as input. The trained NN and/or the updated parameters/coefficients of the NN may be used to select CCH resources (e.g., at the gNB and at the UE).

As illustrated at 912, the trained NN and/or the (e.g., updated) parameters/coefficients of the NN may be transmitted to the UE. As illustrated at 914, the UE may initialize the NN based on the parameters/coefficients. As illustrated at 916, the UE may transmit acknowledgement (ACK) information after initializing the NN. For example, the ACK information may indicate/confirm that the UE has applied the NN parameters/coefficients.

In some aspects, the NN coefficients/parameters may be explicitly calculated and signaled by the gNB or may be selected and signaled as an index of a defined (e.g., by 3GPP wireless communications standards) NN option list. In some aspects, initial NN coefficients/parameters may be signaled to the UE at an initial time, and updated coefficients/parameters may be signaled to the UE at a later time.

In some aspects, a gNB may further train the NN within a NN-based CCH resource selection session (e.g., after NN initialization). In such cases, synchronized coefficient update may be performed (e.g., based on one of a plurality of implementation choices).

In some aspects, a gNB may also signal parameters and configurations (e.g., associated with the NN) to the UE. For example, the gNB may indicate a minimal NN score threshold and/or a list size (e.g., or other characteristics of the list) of the NN based selected resources. In some cases, such a list may be sorted according to a NN score. In some cases, the list size may be tuned by the gNB (e.g., such that its length is sufficient to contain the maximum potential number of CCH transmissions per slot). In some cases, the list may be longer than the maximum potential number of CCH transmissions per slot (e.g., in order to provide flexibility for the gNB scheduler).

After the UE transmits ACK information to the gNB, the NN may be considered to be configured on both sides (UE-side and gNB-side) and waiting for activation. As illustrated at 918, the gNB may transmit a synchronization activation command (e.g., a MAC-CE indicating to start the NN-based CCH resource selection/prediction session). After the activation command is received, the NN-based CCH resource selection/prediction session may begin. The NN-based resource selection/prediction may continue until the UE receives a synchronized deactivation command.

As illustrated at 920, the UE may transmit uplink RS (e.g., SRS) to the gNB. As illustrated at 922, the gNB may transmit downlink RS (e.g., TRS/SSB) to the UE. As illustrated at 924, the gNB and the UE may maintain/perform channel estimation and/or noise estimation as input to the NN for their respective NN-based CCH resource selection.

As illustrated at 926, the gNB may select the CCH resources (e.g., location and aggregation level per DCI to be transmitted) using the NN, using the most updated channel and noise estimation as input, and the UE may predict the CCH resources (e.g., location and aggregation level) list for blind decoding according to the configured parameters/coefficients and/or channel/noise estimation.

As illustrated at 928, the gNB may transmit the CCH using (a decoding candidate within) the NN-selected resources (a subset of possible decoding candidates), and the UE may receive the CCH using the NN-predicted resources (a subset of candidate). According to certain aspects of the present disclosure, the UE may provide feedback associated with using the NN/ML model following the CCH transmission. For example, the UE may periodically report a minimal (e.g., threshold) score (e.g., a NN prediction score) for successful CCH decoding (e.g., using cyclic redundancy check (CRC) techniques) based on CCH resources selected/predicted using the ML model. In some aspects, the gNB may tune the NN/ML model based on the feedback.

The techniques disclosed herein provide an efficient blind decoder framework, utilization of which may reduce the peak number of decoding attempts to the peak number of potential transmitted CCH per slot. Additionally, the techniques disclosed herein may reduce power consumption and signaling overhead, which may help improve efficiency associated with CCH resource selection. The techniques disclosed herein may decrease decoder dimensioning requirements, while achieving faster E2E decoding due to reducing the number of blind decoding attempts.

Additionally, using the techniques disclosed herein may improve support for high mobility scenarios. For example, using a trained NN, the gNB may be capable of rapidly updating the CCH transmission resources selection (e.g., location and aggregation level) by applying an updated channel realization (e.g., obtained from SRS) for the NN.

In some aspects, update of the NN coefficients/parameters may be of low periodicity, since the NN coefficients/parameters may remain constant for the entire communication session, even for high mobility scenarios. Thus, there may be no need to configure a CCH candidates list, since the techniques disclosed herein may allow for ad-hoc optimal CCH resource allocation.

Example Operations

FIG. 10 shows an example of a method 1000 of wireless communication at a user equipment (UE), such as a UE 104 of FIGS. 1 and 3.

Method 1000 begins at step 1005 with receiving, from a network entity, signaling indicating parameters for configuring a machine learning (ML) model. In some cases, the operations of this step refer to, or may be performed by, circuitry for receiving and/or code for receiving as described with reference to FIG. 12.

Method 1000 then proceeds to step 1010 with applying the parameters to configure the ML model. In some cases, the operations of this step refer to, or may be performed by, circuitry for applying and/or code for applying as described with reference to FIG. 12.

Method 1000 then proceeds to step 1015 with performing channel estimation based on at least one reference signal (RS) measurement. In some cases, the operations of this step refer to, or may be performed by, circuitry for performing and/or code for performing as described with reference to FIG. 12.

Method 1000 then proceeds to step 1020 with using the ML model to select control channel (CCH) resources to monitor, based on the channel estimation. In some cases, the operations of this step refer to, or may be performed by, circuitry for using and/or code for using as described with reference to FIG. 12.

Method 1000 then proceeds to step 1025 with monitoring the selected CCH resources for a CCH transmission from the network entity. In some cases, the operations of this step refer to, or may be performed by, circuitry for monitoring and/or code for monitoring as described with reference to FIG. 12.

In some aspects, the selected CCH resources comprise an aggregation level and location per downlink control information (DCI) to be transmitted.

In some aspects, the method 1000 further includes transmitting, to the network entity, an indication of a capability of the UE to use the ML model to select CCH resources. In some cases, the operations of this step refer to, or may be performed by, circuitry for transmitting and/or code for transmitting as described with reference to FIG. 12.

In some aspects, the UE also indicates one or more optimization restrictions.

In some aspects, the method 1000 further includes transmitting a reference signal (RS), wherein the parameters are determined based on the transmitted RS. In some cases, the operations of this step refer to, or may be performed by, circuitry for transmitting and/or code for transmitting as described with reference to FIG. 12.

In some aspects, the method 1000 further includes transmitting, to the network entity, an acknowledgment after applying the parameters to the ML model. In some cases, the operations of this step refer to, or may be performed by, circuitry for transmitting and/or code for transmitting as described with reference to FIG. 12.

In some aspects, the method 1000 further includes receiving, from the network entity, updated parameters. In some cases, the operations of this step refer to, or may be performed by, circuitry for receiving and/or code for receiving as described with reference to FIG. 12.

In some aspects, the method 1000 further includes applying the updated parameters to configure the ML model. In some cases, the operations of this step refer to, or may be performed by, circuitry for applying and/or code for applying as described with reference to FIG. 12.

In some aspects, the signaling indicating the parameters comprises at least one of: explicit ML model coefficients; or an index corresponding to a set of ML model coefficients.

In some aspects, the parameters indicate a list size corresponding to potential decoding candidates that can be transmitted on the CCH resources.

In some aspects, the method 1000 further includes performing noise estimation, wherein the ML model also uses the noise estimation as input when selecting the CCH resources to monitor. In some cases, the operations of this step refer to, or may be performed by, circuitry for performing and/or code for performing as described with reference to FIG. 12.

In some aspects, the method 1000 further includes receiving a command to activate using the ML model for CCH selection. In some cases, the operations of this step refer to, or may be performed by, circuitry for receiving and/or code for receiving as described with reference to FIG. 12.

In some aspects, the method 1000 further includes receiving a command to deactivate using the ML model for CCH selection, wherein the UE uses the ML model for CCH selection after receiving the command to activate until receiving the command to deactivate. In some cases, the operations of this step refer to, or may be performed by, circuitry for receiving and/or code for receiving as described with reference to FIG. 12.

In some aspects, the method 1000 further includes providing feedback associated with using the ML model to select CCH resources. In some cases, the operations of this step refer to, or may be performed by, circuitry for providing and/or code for providing as described with reference to FIG. 12.

In some aspects, the feedback indicates a score for successful CCH decoding based on CCH resources selected using the ML model.

Figure 12:
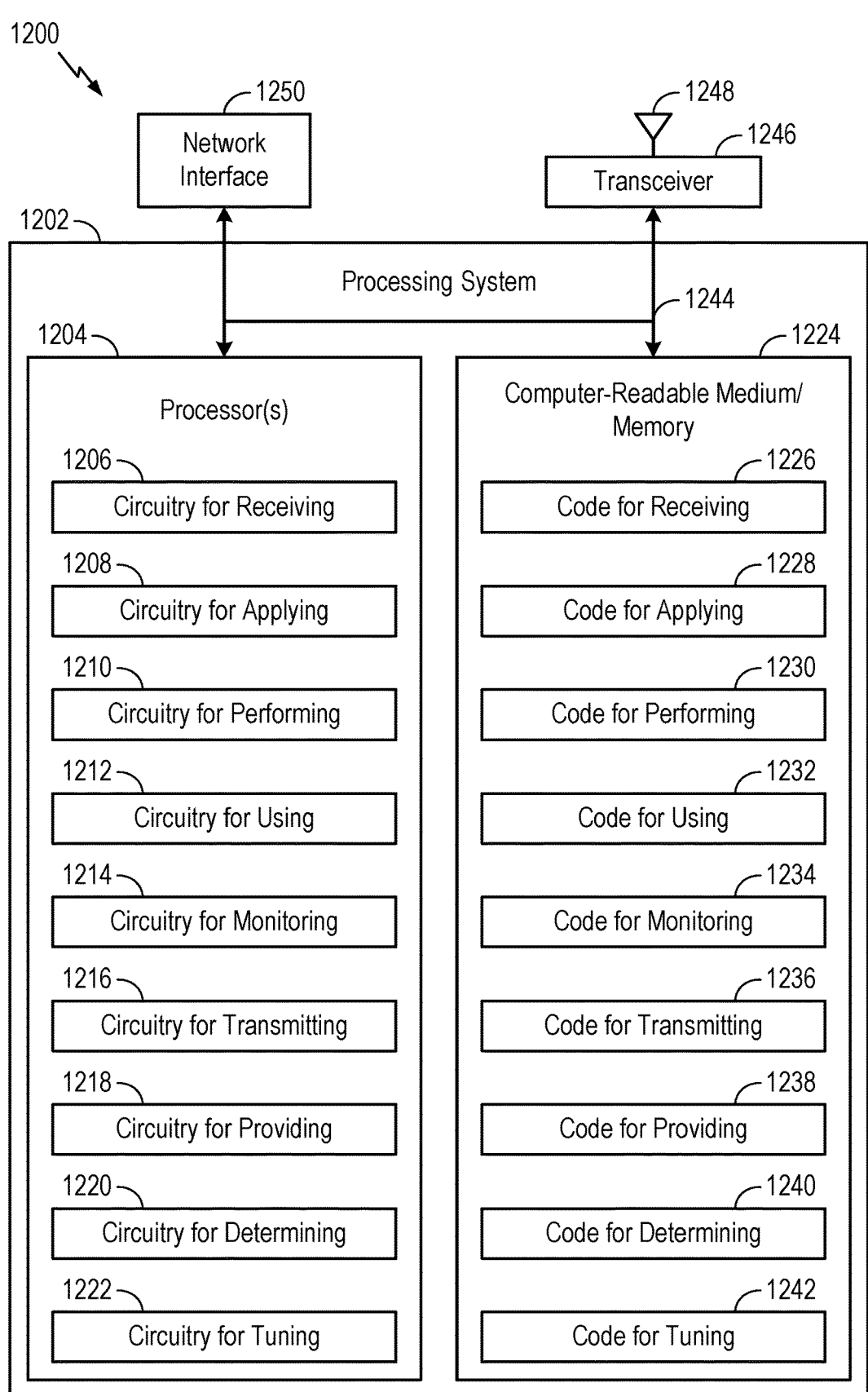
FIG. 12 depicts aspects of an example communications device.

In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.

FIG. 11 shows an example of a method 1100 of wireless communication at a network entity, such as a BS 102 of FIGS. 1 and 3, or a disaggregated base station as discussed with respect to FIG. 2.

Method 1100 begins at step 1105 with transmitting, to a user equipment (UE), signaling indicating parameters for configuring a machine learning (ML) model. In some cases, the operations of this step refer to, or may be performed by, circuitry for transmitting and/or code for transmitting as described with reference to FIG. 12.

Method 1100 then proceeds to step 1110 with applying the parameters to configure the ML model at the network entity. In some cases, the operations of this step refer to, or may be performed by, circuitry for applying and/or code for applying as described with reference to FIG. 12.

Method 1100 then proceeds to step 1115 with performing channel estimation based on at least one reference signal (RS) measurement. In some cases, the operations of this step refer to, or may be performed by, circuitry for performing and/or code for performing as described with reference to FIG. 12.

Method 1100 then proceeds to step 1120 with using the ML model to select control channel (CCH) resources to monitor, based on the channel estimation. In some cases, the operations of this step refer to, or may be performed by, circuitry for using and/or code for using as described with reference to FIG. 12.

Method 1100 then proceeds to step 1125 with transmitting, to the UE, a CCH using the selected CCH resources. In some cases, the operations of this step refer to, or may be performed by, circuitry for transmitting and/or code for transmitting as described with reference to FIG. 12.

In some aspects, the selected CCH resources comprise an aggregation level and location per downlink control information (DCI) to be transmitted.

In some aspects, the method 1100 further includes receiving, from the UE, an indication of a capability of the UE to use the ML model to select CCH resources. In some cases, the operations of this step refer to, or may be performed by, circuitry for receiving and/or code for receiving as described with reference to FIG. 12.

In some aspects, the UE also indicates one or more optimization restrictions.

In some aspects, the method 1100 further includes determining the parameters by training the ML model based on RS measurement for a desired criteria based on the capability and the one or more optimization restrictions. In some cases, the operations of this step refer to, or may be performed by, circuitry for determining and/or code for determining as described with reference to FIG. 12.

In some aspects, the method 1100 further includes receiving, from the UE, an acknowledgment after transmitting the signaling indicating the parameters to the UE. In some cases, the operations of this step refer to, or may be performed by, circuitry for receiving and/or code for receiving as described with reference to FIG. 12.

In some aspects, the method 1100 further includes transmitting, to the UE, signaling indicating updated parameters for the ML model. In some cases, the operations of this step refer to, or may be performed by, circuitry for transmitting and/or code for transmitting as described with reference to FIG. 12.

In some aspects, the signaling indicating the parameters comprises at least one of: explicit ML model coefficients; or an index corresponding to a set of ML model coefficients.

In some aspects, the parameters indicate a list size corresponding to potential decoding candidates that can be transmitted on the CCH resources.

In some aspects, the method 1100 further includes performing noise estimation, wherein the ML model also uses the noise estimation as input when selecting the CCH resources to monitor. In some cases, the operations of this step refer to, or may be performed by, circuitry for performing and/or code for performing as described with reference to FIG. 12.

In some aspects, the method 1100 further includes transmitting, the UE, a command to activate using the ML model for CCH selection. In some cases, the operations of this step refer to, or may be performed by, circuitry for transmitting and/or code for transmitting as described with reference to FIG. 12.

In some aspects, the method 1100 further includes transmitting, to the UE, a command to deactivate using the ML model for CCH selection, wherein the network entity is configured to use the ML model for CCH selection after transmitting the command to activate until transmitting the command to deactivate. In some cases, the operations of this step refer to, or may be performed by, circuitry for transmitting and/or code for transmitting as described with reference to FIG. 12.

In some aspects, the method 1100 further includes receiving feedback associated with using the ML model to select CCH resources. In some cases, the operations of this step refer to, or may be performed by, circuitry for receiving and/or code for receiving as described with reference to FIG. 12.

In some aspects, the method 1100 further includes tuning the ML model based on the feedback. In some cases, the operations of this step refer to, or may be performed by, circuitry for tuning and/or code for tuning as described with reference to FIG. 12.

In some aspects, the feedback indicates a score for successful CCH decoding based on CCH resources selected using the ML model.

In one aspect, method 1100, or any aspect related to it, may be performed by an apparatus, such as communications device 1200 of FIG. 12, which includes various components operable, configured, or adapted to perform the method 1100. Communications device 1200 is described below in further detail.

Note that FIG. 11 is just one example of a method, and other methods including fewer, additional, or alternative steps are possible consistent with this disclosure.

Example Communications Device(s)

FIG. 12 depicts aspects of an example communications device 1200. In some aspects, communications device 1200 is a user equipment, such as UE 104 described above with respect to FIGS. 1 and 3. In some aspects, communications device 1200 is a network entity, such as BS 102 of FIGS. 1 and 3, or a disaggregated base station as discussed with respect to FIG. 2.

The communications device 1200 includes a processing system 1202 coupled to the transceiver 1246 (e.g., a transmitter and/or a receiver). In some aspects (e.g., when communications device 1200 is a network entity), processing system 1202 may be coupled to a network interface 1250 that is configured to obtain and send signals for the communications device 1200 via communication link(s), such as a backhaul link, midhaul link, and/or fronthaul link as described herein, such as with respect to FIG. 2. The transceiver 1246 is configured to transmit and receive signals for the communications device 1200 via the antenna 1248, such as the various signals as described herein. The processing system 1202 may be configured to perform processing functions for the communications device 1200, including processing signals received and/or to be transmitted by the communications device 1200.

The processing system 1202 includes one or more processors 1204. In various aspects, the one or more processors 1204 may be representative of one or more of receive processor 358, transmit processor 364, TX MIMO processor 366, and/or controller/processor 380, as described with respect to FIG. 3. In various aspects, one or more processors 1204 may be representative of one or more of receive processor 338, transmit processor 320, TX MIMO processor 330, and/or controller/processor 340, as described with respect to FIG. 3. The one or more processors 1204 are coupled to a computer-readable medium/memory 1224 via a bus 1244. In certain aspects, the computer-readable medium/memory 1224 is configured to store instructions (e.g., computer-executable code) that when executed by the one or more processors 1204, cause the one or more processors 1204 to perform the method 1000 described with respect to FIG. 10, or any aspect related to it; and the method 1100 described with respect to FIG. 11, or any aspect related to it. Note that reference to a processor performing a function of communications device 1200 may include one or more processors 1204 performing that function of communications device 1200.

In the depicted example, computer-readable medium/memory 1224 stores code (e.g., executable instructions), such as code for receiving 1226, code for applying 1228, code for performing 1230, code for using 1232, code for monitoring 1234, code for transmitting 1236, code for providing 1238, code for determining 1240, and code for tuning 1242. Processing of the code for receiving 1226, code for applying 1228, code for performing 1230, code for using 1232, code for monitoring 1234, code for transmitting 1236, code for providing 1238, code for determining 1240, and code for tuning 1242 may cause the communications device 1200 to perform the method 1000 described with respect to FIG. 10, or any aspect related to it; and the method 1100 described with respect to FIG. 11, or any aspect related to it.

The one or more processors 1204 include circuitry configured to implement (e.g., execute) the code stored in the computer-readable medium/memory 1224, including circuitry for receiving 1206, circuitry for applying 1208, circuitry for performing 1210, circuitry for using 1212, circuitry for monitoring 1214, circuitry for transmitting 1216, circuitry for providing 1218, circuitry for determining 1220, and circuitry for tuning 1222. Processing with circuitry for receiving 1206, circuitry for applying 1208, circuitry for performing 1210, circuitry for using 1212, circuitry for monitoring 1214, circuitry for transmitting 1216, circuitry for providing 1218, circuitry for determining 1220, and circuitry for tuning 1222 may cause the communications device 1200 to perform the method 1000 described with respect to FIG. 10, or any aspect related to it; and the method 1100 described with respect to FIG. 11, or any aspect related to it.

Various components of the communications device 1200 may provide means for performing the method 1000 described with respect to FIG. 10, or any aspect related to it; and the method 1100 described with respect to FIG. 11, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1246 and the antenna 1248 of the communications device 1200 in FIG. 12. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1246 and the antenna 1248 of the communications device 1200 in FIG. 12.

EXAMPLE CLAUSES

Implementation examples are described in the following numbered clauses:

Clause 1: A method for wireless communication at a user equipment (UE), comprising: receiving, from a network entity, signaling indicating parameters for configuring a machine learning (ML) model; applying the parameters to configure the ML model; performing channel estimation based on at least one reference signal (RS) measurement; using the ML model to select control channel (CCH) resources to monitor, based on the channel estimation; and monitoring the selected CCH resources for a CCH transmission from the network entity.

Clause 2: The method of Clause 1, wherein the selected CCH resources comprise an aggregation level and location per downlink control information (DCI) to be transmitted.

Clause 3: The method of any one of Clauses 1-2, further comprising: transmitting, to the network entity, an indication of a capability of the UE to use the ML model to select CCH resources.

Clause 4: The method of Clause 3, wherein the UE also indicates one or more optimization restrictions.

Clause 5: The method of any one of Clauses 1-4, further comprising transmitting a reference signal (RS), wherein the parameters are determined based on the transmitted RS.

Clause 6: The method of any one of Clauses 1-5, further comprising transmitting, to the network entity, an acknowledgment after applying the parameters to the ML model.

Clause 7: The method of any one of Clauses 1-6, further comprising: receiving, from the network entity, updated parameters; and applying the updated parameters to configure the ML model.

Clause 8: The method of any one of Clauses 1-7, wherein the signaling indicating the parameters comprises at least one of: explicit ML model coefficients; or an index corresponding to a set of ML model coefficients.

Clause 9: The method of any one of Clauses 1-8, wherein the parameters indicate a list size corresponding to potential decoding candidates that can be transmitted on the CCH resources.

Clause 10: The method of any one of Clauses 1-9, further comprising performing noise estimation, wherein the ML model also uses the noise estimation as input when selecting the CCH resources to monitor.

Clause 11: The method of any one of Clauses 1-10, further comprising receiving a command to activate using the ML model for CCH selection.

Clause 12: The method of Clause 11, further comprising receiving a command to deactivate using the ML model for CCH selection, wherein the UE uses the ML model for CCH selection after receiving the command to activate until receiving the command to deactivate.

Clause 13: The method of any one of Clauses 1-12, further comprising providing feedback associated with using the ML model to select CCH resources.

Clause 14: The method of Clause 13, wherein the feedback indicates a score for successful CCH decoding based on CCH resources selected using the ML model.

Clause 15: A method for wireless communication at a network entity, comprising: transmitting, to a user equipment (UE), signaling indicating parameters for configuring a machine learning (ML) model; applying the parameters to configure the ML model at the network entity; performing channel estimation based on at least one reference signal (RS) measurement; using the ML model to select control channel (CCH) resources to monitor, based on the channel estimation; and transmitting, to the UE, a CCH using the selected CCH resources.

Clause 16: The method of Clause 15, wherein the selected CCH resources comprise an aggregation level and location per downlink control information (DCI) to be transmitted.

Clause 17: The method of any one of Clauses 15-16, further comprising: receiving, from the UE, an indication of a capability of the UE to use the ML model to select CCH resources.

Clause 18: The method of Clause 17, wherein the UE also indicates one or more optimization restrictions.

Clause 19: The method of Clause 18, further comprising determining the parameters by training the ML model based on RS measurement for a desired criteria based on the capability and the one or more optimization restrictions.

Clause 20: The method of any one of Clauses 15-19, further comprising receiving, from the UE, an acknowledgment after transmitting the signaling indicating the parameters to the UE.

Clause 21: The method of any one of Clauses 15-20, further comprising: transmitting, to the UE, signaling indicating updated parameters for the ML model.

Clause 22: The method of any one of Clauses 15-21, wherein the signaling indicating the parameters comprises at least one of: explicit ML model coefficients; or an index corresponding to a set of ML model coefficients.

Clause 23: The method of any one of Clauses 15-22, wherein the parameters indicate a list size corresponding to potential decoding candidates that can be transmitted on the CCH resources.

Clause 24: The method of any one of Clauses 15-23, further comprising performing noise estimation, wherein the ML model also uses the noise estimation as input when selecting the CCH resources to monitor.

Clause 25: The method of any one of Clauses 15-24, further comprising transmitting, the UE, a command to activate using the ML model for CCH selection.

Clause 26: The method of Clause 25, further comprising transmitting, to the UE, a command to deactivate using the ML model for CCH selection, wherein the network entity is configured to use the ML model for CCH selection after transmitting the command to activate until transmitting the command to deactivate.

Clause 27: The method of any one of Clauses 15-26, further comprising: receiving feedback associated with using the ML model to select CCH resources; and tuning the ML model based on the feedback.

Clause 28: The method of Clause 27, wherein the feedback indicates a score for successful CCH decoding based on CCH resources selected using the ML model.

Clause 29: An apparatus, comprising: a memory comprising executable instructions; and a processor configured to execute the executable instructions and cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by a processor of an apparatus, cause the apparatus to perform a method in accordance with any one of Clauses 1-28.

Clause 32: A computer program product embodied on a computer-readable storage medium comprising code for performing a method in accordance with any one of Clauses 1-28.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a user equipment (UE), comprising:
   at least one memory comprising computer-executable instructions; and
one or more processors configured to execute the computer-executable instructions and cause the UE to:
   receive, from a network entity, signaling indicating parameters for configuring a machine learning (ML) model;
   apply the parameters to configure the ML model;
   perform channel estimation based on at least one reference signal (RS) measurement;
   use the ML model to select control channel (CCH) resources to monitor, based on the channel estimation; and
   monitor the selected CCH resources for a CCH transmission from the network entity.

2. The apparatus of claim 1, wherein the selected CCH resources comprise an aggregation level and location per downlink control information (DCI) to be transmitted.

3. The apparatus of claim 1, wherein the one or more processors are further configured to cause the UE to:
   transmit, to the network entity, an indication of a capability of the UE to use the ML model to select CCH resources.

4. The apparatus of claim 3, wherein the UE also indicates one or more optimization restrictions.

5. The apparatus of claim 1, wherein the one or more processors are further configured to cause the UE to transmit a reference signal (RS), wherein the parameters are determined based on the transmitted RS.

6. The apparatus of claim 1, wherein the one or more processors are further configured to cause the UE to transmit, to the network entity, an acknowledgment after applying the parameters to the ML model.

7. The apparatus of claim 1, wherein the one or more processors are further configured to cause the UE to:
   receive, from the network entity, updated parameters; and
   apply the updated parameters to configure the ML model.

8. The apparatus of claim 1, wherein the signaling indicating the parameters comprises at least one of:
   explicit ML model coefficients; or
   an index corresponding to a set of ML model coefficients.

9. The apparatus of claim 1, wherein the parameters indicate a list size corresponding to potential decoding candidates that can be transmitted on the CCH resources.

10. The apparatus of claim 1, wherein the one or more processors are further configured to cause the UE to perform noise estimation, wherein the ML model also uses the noise estimation as input when selecting the CCH resources to monitor.

11. The apparatus of claim 1, wherein the one or more processors are further configured to cause the UE to receive a command to activate using the ML model for CCH selection.

12. The apparatus of claim 11, wherein the one or more processors are further configured to cause the UE to receive a command to deactivate using the ML model for CCH selection, wherein the UE uses the ML model for CCH selection after reception of the command to activate until reception of the command to deactivate.

13. The apparatus of claim 1, wherein the one or more processors are further configured to cause the UE to provide feedback associated with using the ML model to select CCH resources.

14. The apparatus of claim 13, wherein the feedback indicates a score for successful CCH decoding based on CCH resources selected using the ML model.

15. An apparatus for wireless communication at a network entity, comprising:
   at least one memory comprising computer-executable instructions; and
   one or more processors configured to execute the computer-executable instructions and cause the network entity to:
   transmit, to a user equipment (UE), signaling indicating parameters for configuring a machine learning (ML) model;
   apply the parameters to configure the ML model at the network entity;
   perform channel estimation based on at least one reference signal (RS) measurement;
   use the ML model to select control channel (CCH) resources to monitor, based on the channel estimation; and
   transmit, to the UE, a CCH using the selected CCH resources.

16. The apparatus of claim 15, wherein the selected CCH resources comprise an aggregation level and location per downlink control information (DCI) to be transmitted.

17. The apparatus of claim 15, wherein the one or more processors are further configured to cause the network entity to:
   receive, from the UE, an indication of a capability of the UE to use the ML model to select CCH resources.

18. The apparatus of claim 17, wherein the UE also indicates one or more optimization restrictions.

19. The apparatus of claim 18, wherein the one or more processors are further configured to cause the network entity to determine the parameters by training the ML model based on RS measurement for a desired criteria based on the capability and the one or more optimization restrictions.

20. The apparatus of claim 15, wherein the one or more processors are further configured to cause the network entity to receive, from the UE, an acknowledgment after transmitting the signaling indicating the parameters to the UE.

21. The apparatus of claim 15, wherein the one or more processors are further configured to cause the network entity to:
   transmit, to the UE, signaling indicating updated parameters for the ML model.

22. The apparatus of claim 15, wherein the signaling indicating the parameters comprises at least one of:
   explicit ML model coefficients; or
   an index corresponding to a set of ML model coefficients.

23. The apparatus of claim 15, wherein the parameters indicate a list size corresponding to potential decoding candidates that can be transmitted on the CCH resources.

24. The apparatus of claim 15, wherein the one or more processors are further configured to cause the network entity to perform noise estimation, wherein the ML model also uses the noise estimation as input when selecting the CCH resources to monitor.

25. The apparatus of claim 15, wherein the one or more processors are further configured to cause the network entity to transmit, the UE, a command to activate using the ML model for CCH selection.

26. The apparatus of claim 25, wherein the one or more processors are further configured to cause the network entity to transmit, to the UE, a command to deactivate using the ML model for CCH selection, wherein the network entity is configured to use the ML model for CCH selection after transmission of the command to activate until transmission of the command to deactivate.

27. The apparatus of claim 15, wherein the one or more processors are further configured to cause the network entity to:

receive feedback associated with using the ML model to select CCH resources; and tune the ML model based on the feedback.

28. The apparatus of claim 27, wherein the feedback indicates a score for successful CCH decoding based on CCH resources selected using the ML model.

29. A method for wireless communication at a user equipment (UE), comprising:

receiving, from a network entity, signaling indicating parameters for configuring a machine learning (ML) model;

applying the parameters to configure the ML model;

performing channel estimation based on at least one reference signal (RS) measurement;

using the ML model to select control channel (CCH) resources to monitor, based on the channel estimation; and monitoring the selected CCH resources for a CCH transmission from the network entity.

30. A method for wireless communication at a network entity, comprising:

transmitting, to a user equipment (UE), signaling indicating parameters for configuring a machine learning (ML) model;

applying the parameters to configure the ML model at the network entity;

performing channel estimation based on at least one reference signal (RS) measurement;

using the ML model to select control channel (CCH) resources to monitor, based on the channel estimation; and transmitting, to the UE, a CCH using the selected CCH resources.

* * * * *